US012028138B2

United States Patent
Nilsson et al.

(10) Patent No.: US 12,028,138 B2
(45) Date of Patent: Jul. 2, 2024

(54) NARROWBAND AAS RECEIVER WITH DATA REPLAY INTERFACING

(71) Applicant: Telefonaktiebolaget LM Ericsson (publ), Stockholm (SE)

(72) Inventors: Magnus Nilsson, Lund (SE); Magnus Malmberg, Löderup (SE); Jonas Karlsson, Upplands Väsby (SE); Torbjörn Wigren, Uppsala (SE); Bo Göransson, Sollentuna (SE); Joakim Ahlgren, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 101 days.

(21) Appl. No.: 17/923,743

(22) PCT Filed: May 8, 2020

(86) PCT No.: PCT/EP2020/062939
§ 371 (c)(1),
(2) Date: Nov. 7, 2022

(87) PCT Pub. No.: WO2021/223893
PCT Pub. Date: Nov. 11, 2021

(65) Prior Publication Data
US 2023/0188188 A1 Jun. 15, 2023

(51) Int. Cl.
*H04B 7/06* (2006.01)
*H04W 74/0833* (2024.01)

(52) U.S. Cl.
CPC ....... *H04B 7/0617* (2013.01); *H04W 74/0833* (2013.01)

(58) Field of Classification Search
CPC .. H04B 7/0617; H04B 1/001; H04W 74/0833
(Continued)

(56) References Cited

U.S. PATENT DOCUMENTS 6,259,724 B1 7/2001 Esmailzadeh
6,282,184 B1 8/2001 Lehman et al.
(Continued)

FOREIGN PATENT DOCUMENTS

CN 102238580 A 11/2011
CN 104170445 B 6/2018
(Continued)

OTHER PUBLICATIONS

Intention to Grant for European Patent Application No. 18725809.0, mailed Mar. 29, 2023, 50 pages.
(Continued)

*Primary Examiner* — Fitwi Y Hailegiorgis
(74) *Attorney, Agent, or Firm* — Withrow & Terranova, PLLC

(57) ABSTRACT

An Advanced Antenna System (AAS) receiver and related methods are provided. According to one aspect an AAS receiver comprises a digital processing block of a Radio Frequency Integrated Circuit (RFIC). The digital processing block comprises an interface for communicating with a Central Unit (CU), and a plurality of Antenna Signal Processing Blocks (ASPBs), each receiving a digitized receive signal from a respective antenna element of an antenna array. Each ASPB comprises one or more receivers, each of which receives and processes the signal from the respective antenna element. Some receivers within the ASPB beamform the respective processed signal to produce one or more data streams to be sent to the CU. Other receivers within the ASPB provide the respective processed signal to a processing block that buffers the processed signal and sends it to the CU at a later time, e.g., when traffic to the CU is relatively lower.

16 Claims, 10 Drawing Sheets

(58) Field of Classification Search
USPC .......................................................... 375/267
See application file for complete search history.

(56) References Cited

U.S. PATENT DOCUMENTS

| | | | |
|---|---|---|---|
| 8,755,834 | B2 | 6/2014 | Vaisanen et al. |
| 8,792,839 | B2 | 7/2014 | Hu et al. |
| 10,498,369 | B2 | 12/2019 | Tidestav et al. |
| 2013/0044650 | A1 | 2/2013 | Barker et al. |
| 2014/0050280 | A1 | 2/2014 | Stirling-Gallacher et al. |
| 2015/0078282 | A1 | 3/2015 | Chae et al. |
| 2015/0201336 | A1 | 7/2015 | Shad et al. |
| 2015/0365975 | A1 | 12/2015 | Sahlin et al. |
| 2015/0365977 | A1 | 12/2015 | Tabet et al. |
| 2017/0006638 | A1 | 1/2017 | Sahlin et al. |
| 2017/0019928 | A1 | 1/2017 | Viraraghavan |
| 2017/0331670 | A1 | 11/2017 | Parkvall et al. |
| 2017/0367121 | A1 | 12/2017 | Wei et al. |
| 2017/0374683 | A1 | 12/2017 | Tavares et al. |
| 2018/0049238 | A1 | 2/2018 | Frenne et al. |
| 2018/0262994 | A1* | 9/2018 | Park ...................... H04W 52/52 |
| 2019/0021118 | A1 | 1/2019 | Tishbi |
| 2019/0228545 | A1* | 7/2019 | Gan ...................... G06T 11/003 |

FOREIGN PATENT DOCUMENTS

| | | | |
|---|---|---|---|
| JP | 2008048086 | A | 2/2008 |
| KR | 20170049273 | A | 5/2017 |
| WO | 2012174922 | A1 | 12/2012 |
| WO | 2015188861 | A1 | 12/2015 |
| WO | 2017032391 | A1 | 3/2017 |
| WO | 2019219180 | A1 | 11/2019 |
| WO | 2021223892 | A1 | 11/2021 |
| WO | 2021228349 | A1 | 11/2021 |

OTHER PUBLICATIONS

Ericsson, "R1-161558: Introduction of NB-IoT," Draft Change Request, 3GPP TSG-RAN WG1 Meeting #84, Feb. 15-19, 2016, St. Julian's, Malta, 16 pages.

First Office Action for Chinese Patent Application No. 20188095685.9, mailed Sep. 9, 2023, 8 pages.

Office Action for Japanese Patent Application No. 2022-567626, mailed Feb. 20, 2024, 5 pages.

Ericsson, "R1-1706015: NR four-step random access procedure," 3GPP TSG-RAN WG1 Meeting #88bis, Apr. 3-7, 2017, Spokane, Washington, 7 pages.

Ericsson, "R1-1714047: Consideration of PRACH Configuration in NR," 3GPP TSG-RAN WG1 Meeting #90, Aug. 21-25, 2017, Prague, Czech Republic, 5 pages.

Examination Report for European Patent Application No. 15753054.4, mailed Jan. 25, 2019, 6 pages.

Intention to Grant for European Patent Application No. 15753054.4., mailed Dec. 14, 2020, 5 pages.

International Search Report and Written Opinion for International Patent Application No. PCT/EP2015/069228, mailed Apr. 20, 2016, 9 pages.

International Search Report and Written Opinion for International Patent Application No. PCT/EP2018/062636, mailed Jan. 24, 2019, 12 pages.

Notice of Allowance for U.S. Appl. No. 17/055,575, mailed May 26, 2021, 7 pages.

Non-Final Office Action for U.S. Appl. No. 15/753,058, mailed Jul. 6, 2018, 9 pages.

Final Office Action for U.S. Appl. No. 15/753,058, mailed Dec. 26, 2018, 10 pages.

Advisory Action for U.S. Appl. No. 15/753,058, mailed Mar. 8, 2019, 3 pages.

Non-Final Office Action for U.S. Appl. No. 15/753,058, mailed Apr. 4, 2019, 6 pages.

Ericsson, "R1-1700298: NR PRACH design," 3GPP TSG-RAN WG1 NR adhoc, Jan. 16-20, 2017, Spokane, Washington, 22 pages.

Ericsson, "R1-1706014: NR PRACH design and evaluations," 3GPP TSG-RAN WG1 Meeting #88bis, Apr. 3-7, 2017, Spokane, Washington, 40 pages.

Giordani, et al., "Standalone and Non-Standalone Beam Management for 3GPP NR at mmWaves," IEEE Communications Magazine, vol. 57, Issue 4, published online May 2018, 7 pages.

Oppo, "R1-1910987: On Channel Structure for 2-step Rach," 3GPP TSG RAN WG1 #98bis, Oct. 14-20, 2019, Chongqing, China, 9 pages.

International Search Report and Written Opinion for International Patent Application No. PCT/EP2020/062938, mailed Feb. 9, 2021, 11 pages.

International Search Report and Written Opinion for International Patent Application No. PCT/EP2020/062939, mailed Feb. 9, 2021, 11 pages.

International Search Report and Written Opinion for International Patent Application No. PCT/EP2020/062975, mailed Jan. 26, 2021, 11 pages.

Examination Report for Indian Patent Application No. 202047054014, mailed Mar. 6, 2023, 5 pages.

* cited by examiner

NARROWBAND AAS RECEIVER WITH DATA REPLAY INTERFACING

This application is a 35 U.S.C. § 371 national phase filing of International Application No. PCT/EP2020/062939, filed May 8, 2020, the disclosure of which is incorporated herein by reference in its entirety.

TECHNICAL FIELD

The present disclosure relates to cellular systems with Advanced Antenna Systems (AAS), particularly systems supporting Multiple Input Multiple Output (MIMO) antenna systems, including Multi-User MIMO (MU-MIMO) and Massive MIMO (M-MIMO) antenna systems.

BACKGROUND

Wireless communication system bitrate demand continues to increase. As the lower cellular Frequency Ranges (FRs) fill up, higher cellular frequency spectrums are taken into use. In Fifth Generation (5G) cellular systems, a new frequency range is introduced, called FR2 (24250 Megahertz (MHz)-52600 MHz), referred to as millimeter wave (mmW). In 5G, beamforming (BF) is introduced to increase both capacity and coverage. In FR2, BF is mainly used to combat the greater path loss that naturally occurs at higher frequencies due to the decreased antenna element area. BF and beamsteering are performed by coherently combining RF signals from smaller antenna elements. By phase-shifting and/or amplifying the signal into the antenna elements, the desired beam is formed. These techniques mitigate the problem of path loss by radically increasing the beam gain (e.g., via constructive interference of multiple, relatively low power beams) and thereby restoring the rated Equivalent Isotropic Radiated Power (EIRP) rating of mmW base stations to usable levels. There are a number of techniques commonly used to perform BF.

Analog transmit BF is a popular, low complexity way of doing BF. Here, the signals to and from the antennas are beamformed in the Radio Frequency (RF) domain, close to the antenna. The rest of the signal chain is common to all or a portion of the antenna elements. In this approach, all of the data is converted into a time domain stream prior to being sent to the RF Application Specific Integrated Circuits (ASICs), also called "RFICs", and antennas. Since one set of beam weights (e.g., amplitude and phase shift) is applied during the duration of one Orthogonal Frequency Division Multiplexing (OFDM) symbol, the transmitted beam pattern is therefore spatially fixed for all data transmitted during that OFDM symbol. Although the transmitted beam pattern may have peaks of higher gain in multiple directions, the entire data stream will be transmitted through that one beam pattern, which limits the possibility to simultaneously transmit data to multiple users: the one beam pattern may have a null in the different direction, rendering it unsuitable for transmitting to a user in that different direction. This generates problems in scenarios where it would be advantageous to direct different data streams in different directions, e.g., by frequency selective scheduling.

Digital transmit BF, in comparison, uses late Inverse Fast Fourier Transform (IFFT) processing to transform complex Orthogonal Frequency Division/Multiple Access (OFDMA) symbols to data streams in time, with each user accessing all antenna elements independently, thereby allowing frequency selective beam forming.

FIG. 1 shows a conventional base station and receive path components. Base station 100 includes an antenna matrix 102 with many antenna elements is divided into portions, each controlled by an RFIC 104. The RFICs 104 are interconnected to a central unit 106, where the carriers from each RFIC 104 are added and further processed. The central unit 106 combines the signals from all RFICs 104, performs signal processing, and sends the result to a Digital Unit (DU) 108 for further analysis. For example, the central unit 106 combines all the received signals and converts them to frequency domain using a discrete Fourier transform (DFT). Each RFIC 104 contains an analog portion and a digital portion.

FIG. 2 shows a generic block diagram of an analog RF transceiver 200, which is part of the analog portion of an RFIC 104. A typical RFIC 104 may have one analog RF transceiver 200 per antenna segment serviced by the RFIC 104. The upper part shows the transmitter consisting of digital to analog converters (DACs) 202, analog Low-Pass Filters (LPFs) 204, up-conversion mixers 206, programmable gain amplifiers 208, Band-Pass Filters (BPFs) 210, and Power Amplifiers (PAs) 212. The lower part shows the receiver, consisting of a low noise amplifier (LNA) 214, BPF 210, Digital Step Attenuator (DSA) 216, down-conversion mixers 218, LPFs 204, and Analog to Digital Converters (ADCs) 220. In the middle there is a Phase Locked Loop (PLL) 226, used to generate the clock required for up/down conversion mixing. The transmitter and receiver are connected to an antenna 222, e.g., via a duplexer 224. By connecting a transceiver 200 to each antenna, there is full freedom to perform arbitrary BF in the digital domain, i.e., the actual BF occurs through digital signal processing outside of the transceiver 200, on an RFIC. One disadvantage of this technique, however, is that it requires IFFT processing on the RFICs which adds complexity. Also, the bit resolution of the ADCs and DACs must be quite high to cater to the requirements of the high data rates of the data transmissions. If more ADCs/DACs are used, the resolution in each ADC/DAC may be relaxed compared to analog beam forming, but it is still problematic to have many ADCs/DACs. The combination of many ADCs/DACs (due to many antenna elements), the high sampling rate, and the high resolution may lead to very high power consumption and cost FIG. 3 shows a generic block diagram of a digital portion 300 of an RFIC 104. Each block 302 represents complex (I+Q) signal processing. The digital portion 300 of an RFIC 104 may be coupled to multiple analog RF transceivers 100, each transceiver providing the digital portion 300 with an antenna receive signal, one antenna receive signal per block 302. Within block 302, each antenna receive signal (e.g., RX_1 through RX_N) is split into one or more carriers. Each carrier is Frequency Tuned (FT) 304 to place the desired carrier at DC. Then each carrier is low-pass filtered 306, decimated 308, and channel filtered 310. Finally, the carriers enter the BF blocks 312 where the carriers are beamformed and combined to form one or several data streams. All data streams from each RFIC 300 are then sent via an interface 314 to the central unit for combination and DFT processing. The number of data streams per carrier is smaller than the number of antennas; in this example three data streams are formed.

FIG. 3 illustrates the complementary digital signal processing needed in a Base Station (BS) receiver (i.e., UL data transmission). Each antenna signal is filtered, split, and down-converted to individual carriers. Each of the carriers corresponds to a portion of the received spectra. Then the carriers from each antenna are combined to one or several layers in the BF blocks 312. Each layer is then sent for further processing to a central digital unit. The antenna matrix is normally connected to several RFICs, each RFIC handling a number of antenna elements. This system is less complex than full digital BF, in that the number of Fast Fourier Transforms (FFTs) are reduced, i.e., one per layer instead of one per antenna.

Even these systems have problems, however, when a User Equipment (UE) is trying to find the base station for initial access: if the beam pattern is pointing away from the UE, the UE is not likely to be able to detect the beam, and as a result the UE can't "see" the base station. Present FR2 MS systems use beam sweeping or wider initial beams to combat these issues. For example, in 5G New Radio (NR), the combination of Synchronization Signals (SS) and the Physical Broadcast Channel (PBCH) is known as the Synchronization Signal Block (SSB). The SS may include both Primary Synchronization Signals (PSS) and Secondary Synchronization Signals (SSS). In 5G, the Physical Random Access Channel (PRACH) is a special signal, in which the same symbol is repeated multiple times in the time domain. In NR, there can be multiple SSBs sent in multiple directions, in which case there would be multiple PRACH occasions corresponding to each SSB direction. The UE can therefore select a certain beam and send the PRACH using that beam. In order for the network to figure out which beam the UE has selected, the Third Generation Partnership Project (3GPP) defines a specific mapping between SSB and Random Access Channel (RACH) Occasion (RO). By detecting which RO the UE used to send the PRACH, the network can figure out which SSB beam the UE has selected. That is, the PRACH timing indicates the UE direction. This solution, however, adds cost in terms of coverage, latency and/or capacity, as valuable UL slots are occupied by ROs.

The solutions described above have other disadvantages as well. For example, in analog BF, all the signals close to the antenna are combined and the combined signals (possibly at the Intermediate Frequency (IF)) are routed to A2D/D2A converters placed some distance away from the antenna due to space limitations. It would be very difficult to route a signal from each antenna to a dedicated converter. In addition, the second generation FR2 systems target higher capacity and a larger number of connected users. This puts challenges on the analog BF method and imposes more and more overhead for beam management.

To combat the capacity need, hybrid or digital BF can be used. This allows for multiplexing of users both in frequency, i.e., by Frequency Domain Multiplexing (FDM), and in space, i.e., by Spatial Domain Multiplexing (SDM). The number of antennas is still high (hundreds), however, and the bandwidths are increasing towards 1 GHz. Generating and distributing a digitized version from each antenna is therefore very challenging.

To combat the high bitrates that are generated when using digital BF with a high number of antennas, implementation of distributed BF may be used. Then the FDM and SDM advantages are retained. However, there is no access to each antenna and therefore beam sweeping are still required in the UL for UE directional finding, even for hybrid or digital BF.

SUMMARY

Methods and systems for providing a versatile MS receiver are herein presented. The addition of a digital block gives access to narrowband data from all controlled antennas in an MS solution with distributed digital Beamforming (BF). One benefit of this technique is that narrowband signals in any direction within the scan range can be received in parallel with the normal communication with good sensitivity and without causing capacity loss or delays. The hardware overhead to implement this functionality is minimal, being just a small digital block.

According to one aspect of the present disclosure, an Advanced Antenna System (MS) receiver comprises a digital processing block of a Radio Frequency Integrated Circuit (RFIC), the digital processing block comprising an interface for communicating with a central unit and a plurality of antenna signal processing blocks, each receiving a digitized receive signal from a respective antenna element of an antenna array. Each antenna signal processing block comprises: one or more receivers, each receiver comprising circuitry to receive the signal from the respective antenna element and process the received signal to create a processed signal. Each of at least a first subset of the one or more receivers provides its processed signal to a beamforming block comprising circuitry to beamform the processed signal to produce one or more data streams and provide the one or more data streams to the interface for communication to the central unit. Each of at least a second subset of the one or more receivers provides its processed signal to a processing block that buffers the processed signal and that controls when the buffered processed signal is sent to the interface for communication to the central unit.

In some embodiments, controlling when the buffered processed signal is sent to the interface for communication to the central unit comprises sending the buffered signal to the central unit during an Uplink (UL) portion of a Time Domain Duplexing (TDD) frame, during a Downlink (DL) portion of a TDD frame, or during both an UL portion and a DL portion of a TDD frame In some embodiments, the processing block accumulates a first defined portion of the processed signal and provides a result of the accumulation to the central unit.

In some embodiments, the first defined portion of the processed signal comprises a subset of a plurality of received symbols for the Physical Random Access Channel (PRACH).

According to another aspect of the present disclosure, a method in an MS receiver comprises, at a digital processing block of a RFIC, receiving a plurality of digitized receive signals, each digitized received signal coming from a respective antenna element of an antenna array, and processing each of the respective digitized receive signals to create a respective processed signal, wherein each of at least a first subset of the processed signals is beamformed to produce one or more data streams that are provided to a central unit, and wherein each of at least a second subset of the processed signals is buffered and provided to the central unit at a specified time.

In some embodiments, providing each of the at least a second subset of the processed signals to the central unit at a specified time comprises sending the buffered signal to the central unit during an UL portion of a TDD frame, during a DL portion of a TDD frame, or during both an UL portion and a DL portion of a TDD frame.

In some embodiments, the method further comprises accumulating a first defined portion of each of the at least a second subset of the processed signals, and providing a result of the accumulation to the central unit.

In some embodiments, the first defined portion comprises a subset of a plurality of received symbols for the Physical Random Access Channel (PRACH).

According to yet another aspect of the present disclosure, an MS receiver comprises a digital processing block of a RFIC, the digital processing block comprising circuitry configured to receive a plurality of digitized receive signals, each digitized received signal coming from a respective antenna element of an antenna array, and process each of the respective digitized receive signals to create a respective processed signal, wherein each of at least a first subset of the processed signals is beamformed to produce one or more data streams that are provided to a central unit, and wherein each of at least a second subset of the processed signals is buffered and provided to the central unit at a specified time.

In some embodiments, the processing circuitry is further configured to perform the steps of any of the methods disclosed herein.

According to yet another aspect of the present disclosure, an MS receiver comprises a digital processing block of an RFIC, the digital processing block comprising modules operable to receive a plurality of digitized receive signals, each digitized received signal coming from a respective antenna element of an antenna array, and process each of the respective digitized receive signals to create a respective processed signal, wherein each of at least a first subset of the processed signals is beamformed to produce one or more data streams that are provided to a central unit, and wherein each of at least a second subset of the processed signals is buffered and provided to the central unit at a specified time.

In some embodiments, the modules are further operable to perform the steps of any of the methods disclosed herein.

According to yet another aspect of the present disclosure a base station configured to communicate with a User Equipment (UE) comprises a radio interface and processing circuitry configured to perform the steps of any of the methods disclosed herein.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
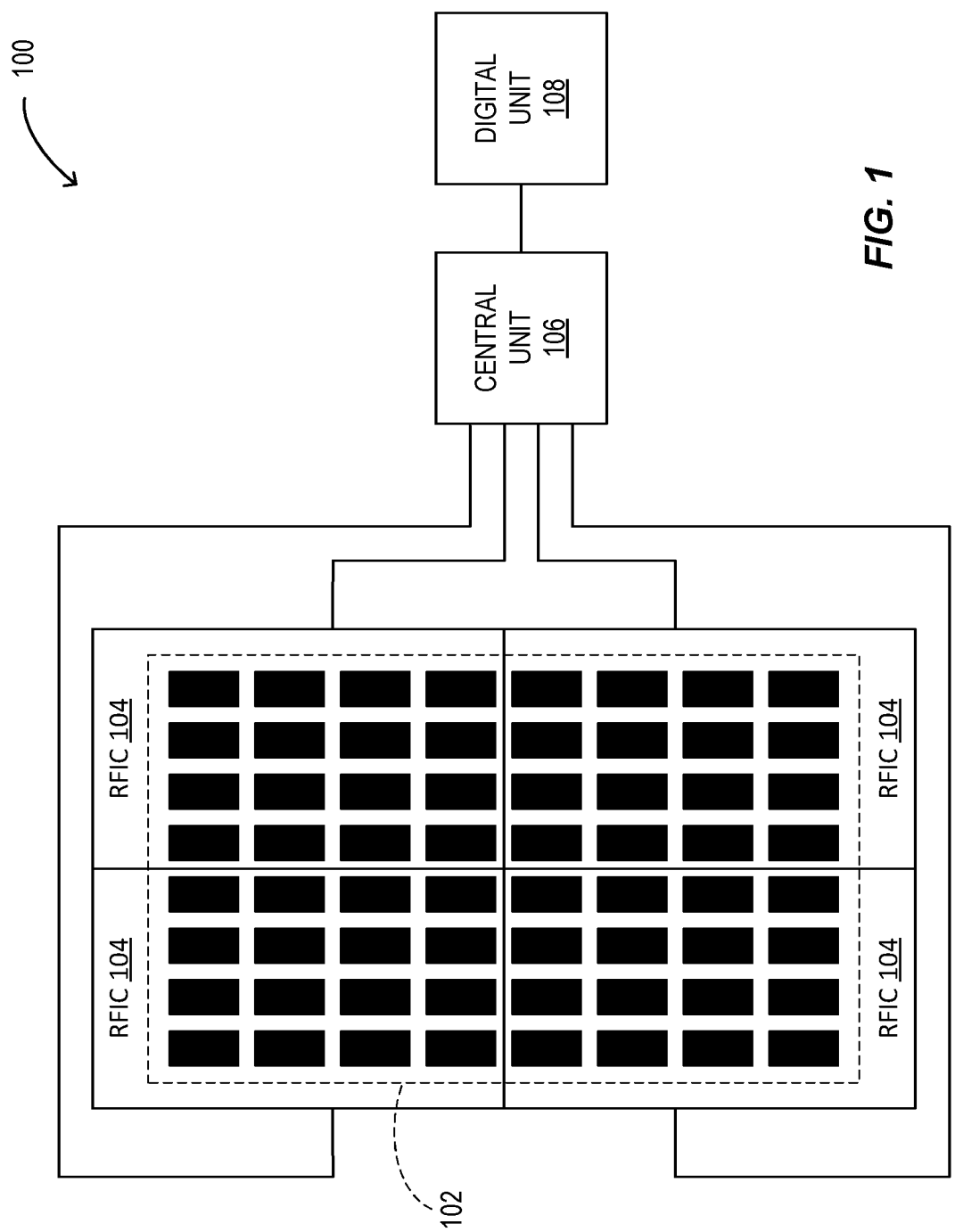
FIG. 1 shows a generic block diagram of an analog Radio Frequency (RF) transceiver.
Figure 2:
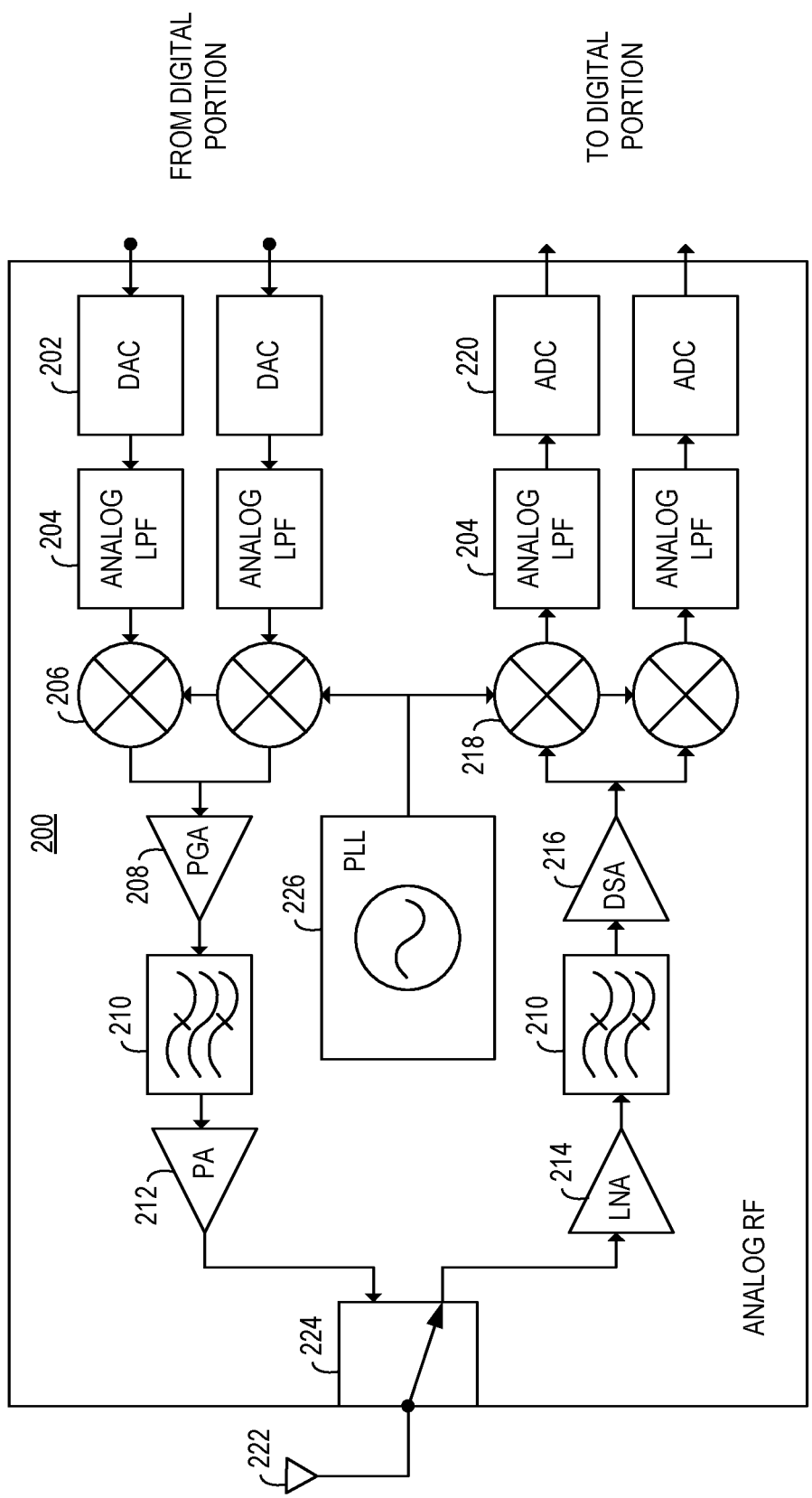
FIG. 2 shows a conventional base station and receive path components.
Figure 3:
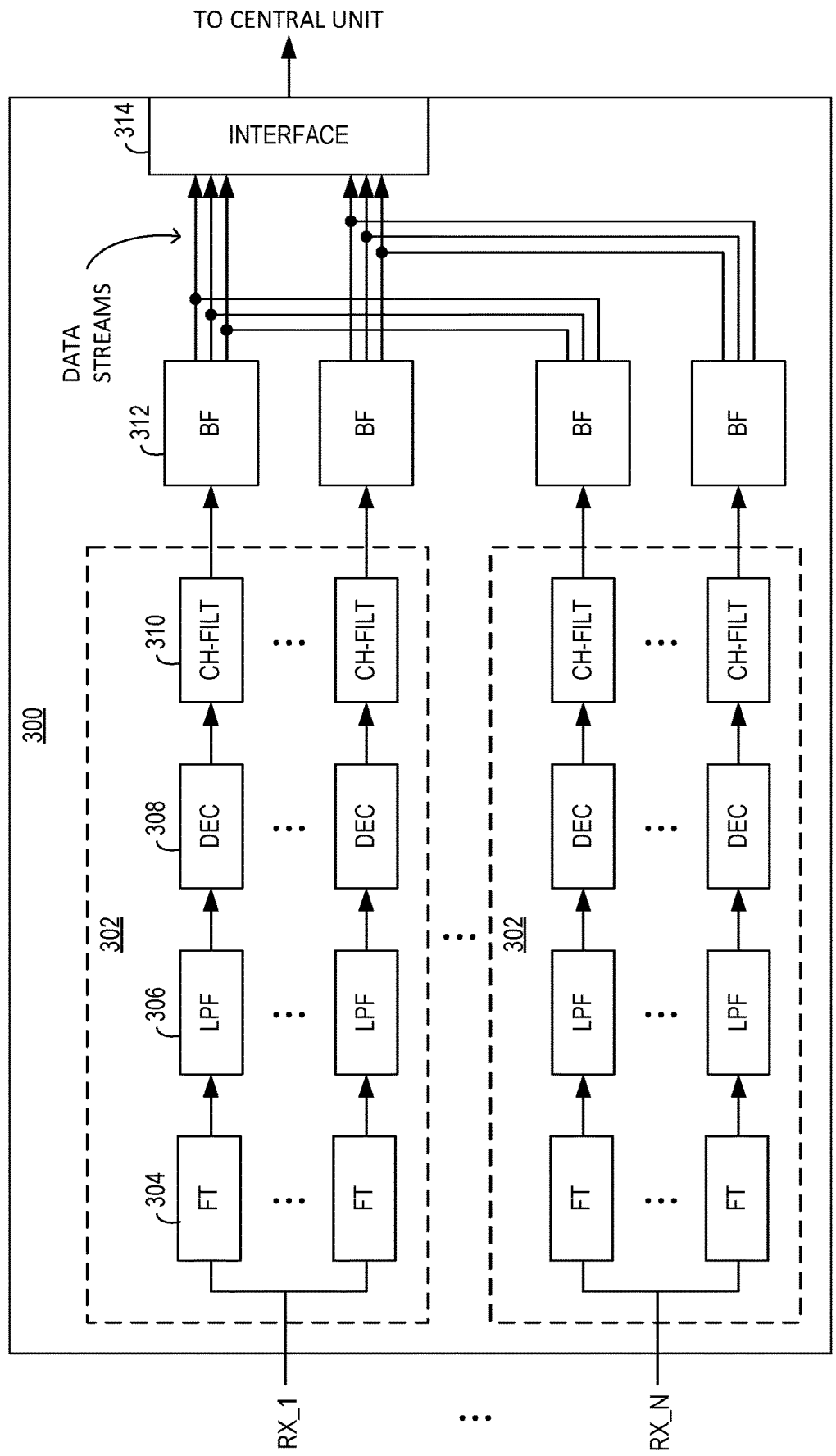
FIG. 3 shows a generic block diagram of the digital portion of a conventional Radio Frequency Integrated Circuit (RFIC)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As noted above, conventional analog and digital Beamforming (BF) techniques have their disadvantages: analog BF is relatively simple but allows only one BF pattern per OFDM symbol; digital BF allows multiple BF patterns per OFDM symbol but requires significant computing resources to be included in each RFIC; and both use beam sweeping or wider initial beams for Random Access (RA) operations. Beam sweeping in particular occupies multiple resources over time as the beam is swept around horizontally and vertically within the node's service area, which in a 3-sector site, for example, would be 120 degrees per sector. Moreover, the disadvantages are not limited to RA use cases. Beam sweeping at mmW frequencies is a substantial problem for E-911 positioning where Time Difference Of Arrival (TDOA) methods are used; in these scenarios it is necessary to find multiple base stations and/or UEs from multiple base stations.

Commonly owned International Patent Application Publication No. WO 2017/032391, filed on Aug. 21, 2015, herein incorporated by reference in its entirety, discloses a method to solve some of these issues by adding an analog narrowband receiver in parallel with the analog wideband receiver. The analog narrowband receiver extracts a small frequency portion from each antenna element and sends that for digital processing. The main idea is that, since directions are more stable than the complex channel, the narrowband signals received are enough for estimation of the main directions of the received signal. The analog wideband receiver can then use the determined directions to perform wideband beamformed reception in the directions obtained from the narrowband receiver. This secures a wideband reception that retains a high Signal to Noise Ratio (SNR), while reducing the number of data streams that need to be interfaced for further combining, i.e., to just one data stream for each direction detected.

Commonly owned International Patent Application Publication No. WO 2019/219180, filed on May 16, 2018, herein incorporated by reference in its entirety, discloses accumulation of the PRACH signal in the time domain to lower the requirements on interfaces and the central unit. By using the analog narrowband receiver described in WO 2017/032391, all SSBs can be mapped to the same PRACH occasion and instead use spatial Discrete Fourier Transform (DFT) processing for direction finding. This speeds up the initial access procedure and frees up Uplink (UL) slots for normal UL communication. In the central unit, the UL signal processing of the narrowband receiver typically consists of one DFT per antenna and a spatial DFT to convert the antenna signals to direction signals in beam space. Although this technique solves the problem of direction finding within a narrow bandwidth, the implementation is very costly. Having narrowband Band Pass (BP) filters and low rate converters connected to each antenna is very complex to implement.

The present disclosure provides an improvement on the techniques above. According to embodiments of the present disclosure, a small digital block is added to each antenna path. The new digital block filters out narrowband receiver data and sends this narrowband data from each antenna to a Central Unit (CU) for further processing. This architecture provides all the benefits of the analog narrowband receiver described above while reducing the complexity of associated with the narrowband receive. In order to provide access to all antennas by the CU, the narrowband receiver is added in the digital domain rather than in the analog domain. This is illustrated in FIG. 4.

Figure 4:
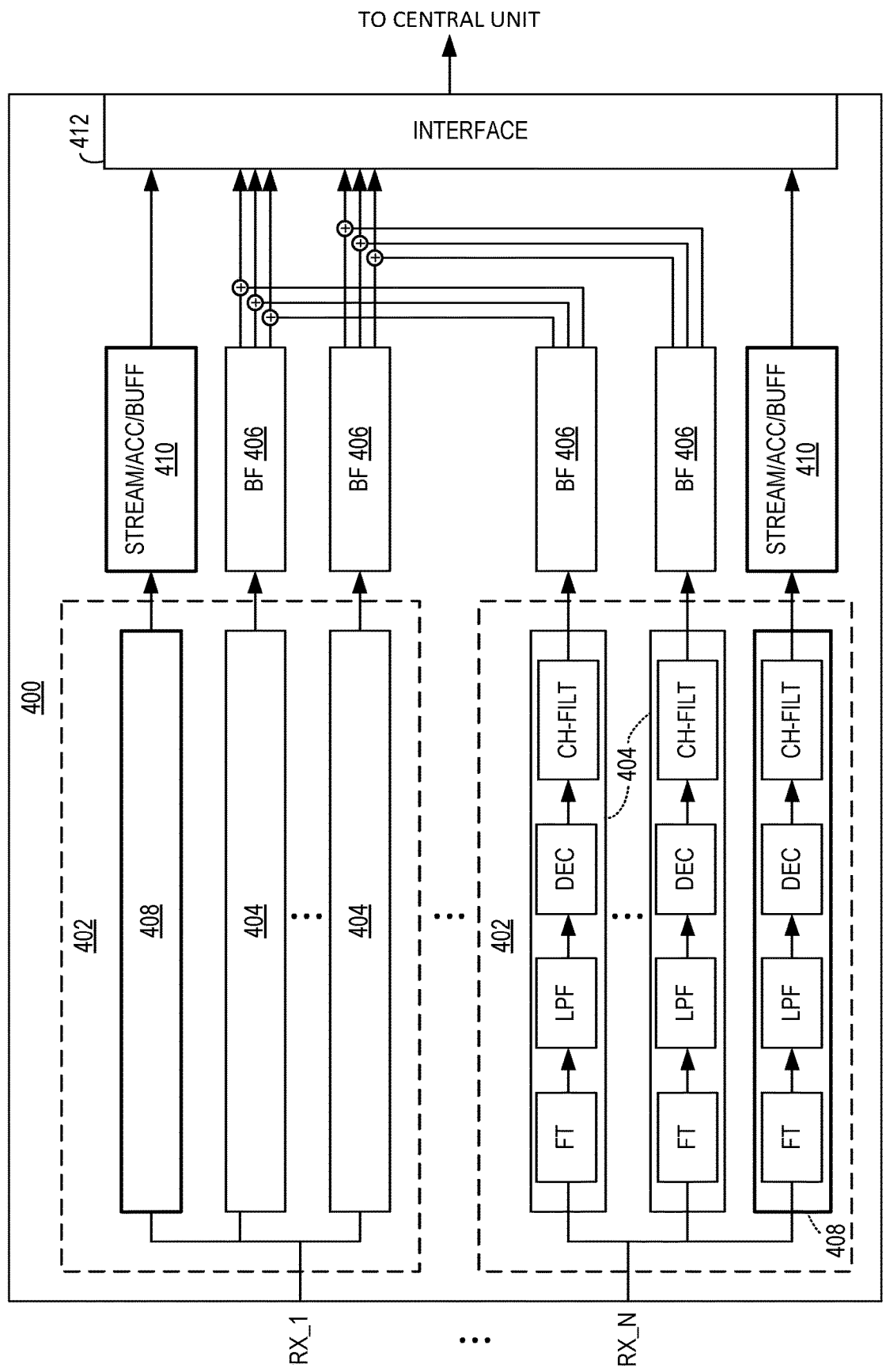
FIG. 4 illustrates an improved RFIC 400 according to some embodiments of the present disclosure.

FIG. 4 illustrates an improved digital portion 400 of an RFIC 104 according to some embodiments of the present disclosure. In the embodiment illustrated in FIG. 4, the improved digital portion 400 includes multiple signal processing blocks 402 representing complex (I+Q) signal processing, and each signal processing block 402 includes multiple carriers 404, each supplying a signal to a respective BF unit BF 406. The improved digital portion 400 also includes an additional Narrowband Receiver (NBR) 408. In the embodiment illustrated in FIG. 4, the structure (e.g., the signal processing chain) of the NBR 408 is the same as for the carrier paths 404, but the bandwidth of the added NBR 408 is less than the bandwidth for the other carrier paths 404, and so the carrier paths 404 may be referred to herein as Wideband Receivers (WBRs) 404. In some embodiments, the NBR 408 can capture one full carrier down to some fraction of a full carrier, e.g., one-fourth of a carrier, but other portions are also contemplated by the present disclosure. Also, there is no BF of the narrowband receiver paths. Instead, that data is sent to the CU for further processing, such as spatial DFT processing to determine beam directions.

In the embodiment illustrated in FIG. 4, there is an additional block 410 that can send the data to the CU immediately, e.g., via an interface 412, or buffer it for later sending, but in alternative embodiments that block may be omitted. In some embodiments which include block 410, block 410 can perform accumulation of data, such as data primarily used for PRACH reception. Using this technique, the digital down-conversion and decimation are connected to each antenna, but there is no combining. This achieves narrowband access to each antenna element by the CU.

In the embodiment illustrated in FIG. 4, both the WBRs and the NBRs include the following functional blocks, which may include circuitry to perform their particular functions: a Frequency Translation (FT) block, which is used to select the correct center frequency for the carrier extraction from the multi-carrier antenna signal RX; a Low Pass Filter (LPF); a Decimator (DEC); and a Channel Filter (CH-FILT). In this embodiment, the NBR has a signal processing pipeline that is similar to that used by the WBR, but with a narrower bandwidth.

Figure 5:
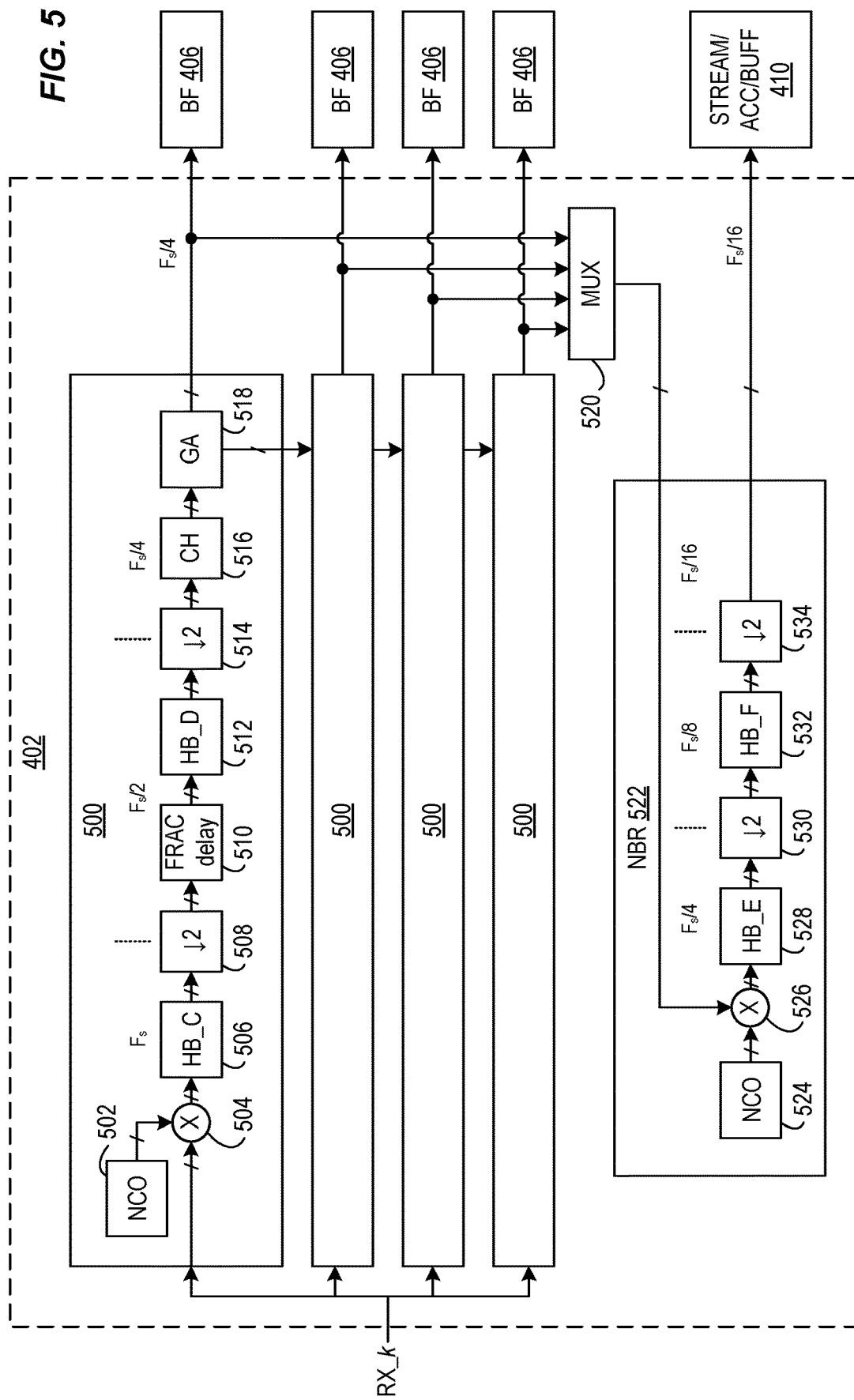
FIG. 5 illustrates in the detail an embodiment of a narrowband receiver according to some embodiments of the present disclosure.

FIG. 5 illustrates another improved digital portion 400 of an RFIC 104 according to some embodiments of the present disclosure, and specifically another embodiment of signal processing block 402. In the embodiment illustrated in FIG. 5, each antenna stream RX_k is split into 4 carriers via processing blocks 500, which may be roughly equivalent to the WBRs 404 in FIG. 4. In the embodiment illustrated in FIG. 5, each processing block 500 contains a Numerically Controlled Oscillator (NCO) 502 and a mixer 504, which select the center frequency for the carrier extraction from the multi-carrier antenna signal RX. Each processing block 500 also contains a first Half Band (HB) filter 506, a first downconverter 508, a fractional delay unit 510, a second HB filter 512, a second downconverter 514, a channel filter (CH) 516, and a Gain Adjuster (GA) 518. In each processing block, the antenna signal is sampled at some sampling frequency FS, which is reduced after each downconverter to FS/2, FS/4, and so on. In one example embodiment, FS=491.52 megachips per second (MCPS).

A multiplexer 520 selects the output from one of the processing blocks 500 and passes it to NBR 522. The NBR 522 includes its own NCO 524, whose signal is mixed with the input signal at mixer 526. The output of mixer 526 is sent through a signal chain that contains a third HB filter 528, a third downconverter 530, a fourth HB filter 532, and a fourth downconverter 534.

Thus, the multiplexer 520 selects data from one of the carriers, which is passed to the NBR 522. Thus, the NBR 522 in FIG. 5 works on a lower incoming data rate compared to the NBR 408 in FIG. 4. The NBR 522 filters out $\frac{1}{4}^{th}$ of the carrier at an arbitrary position in frequency domain (e.g., the output from one of the processing blocks 500), and downsamples it. The output from the NBR 522 is then sent to the stream/accumulate/buffer 410 of FIG. 4, or directly to the CU via the interface 412, in embodiments which do not include the stream/accumulate/buffer 410.

The benefit of the methods and systems described above is that narrowband signals in any direction within the scan range can be received in parallel with the normal communication with good sensitivity and without causing capacity loss or delays, which allows all SSBs to be mapped to the same PRACH occasion and thus frees up UL slots for normal UL communication. Moreover, the hardware overhead to implement this functionality is minimal, being just a small digital block, yet providing the digital unit with access to each antenna element in the array individually.

Figure 6:
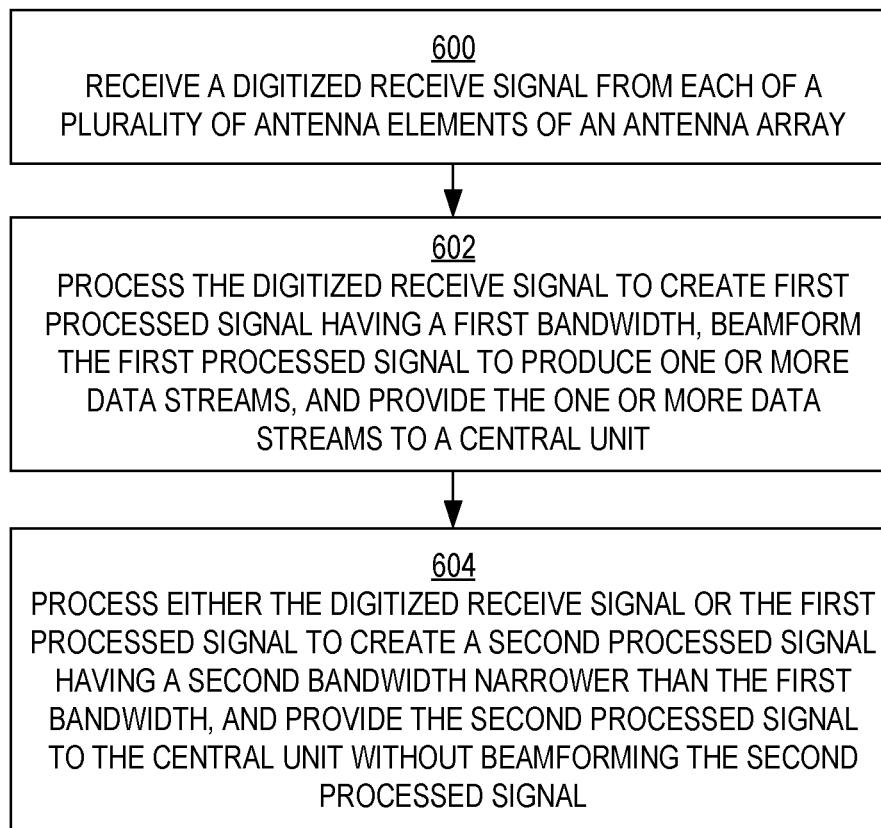
FIG. 6 is a flow chart illustrating a method of a base station according to some embodiments of the present disclosure.

FIG. 6 is a flow chart illustrating a method of a base station according to some embodiments of the present disclosure. In the embodiment illustrated in FIG. 6, the method includes the following steps, which may be performed, for example, at a digital processing block 400 of an RFIC 104.

Step 600. Receive a digitized receive signal from each of a plurality of antenna elements of an antenna array, and for each digitized receive signal, do the following steps:

Step 602. Process the digitized received signal to create a first processed signal having a first bandwidth, beamform the first processed signal to produce one or more data streams, and provide the one or more data streams to a CU.

Step 604. Process either the digitized receive signal or the first processed signal to create a second processed signal having a second bandwidth narrower than the first bandwidth, and provide the second processed signal to the CU without beamforming the second processed signal.

Figure 7:
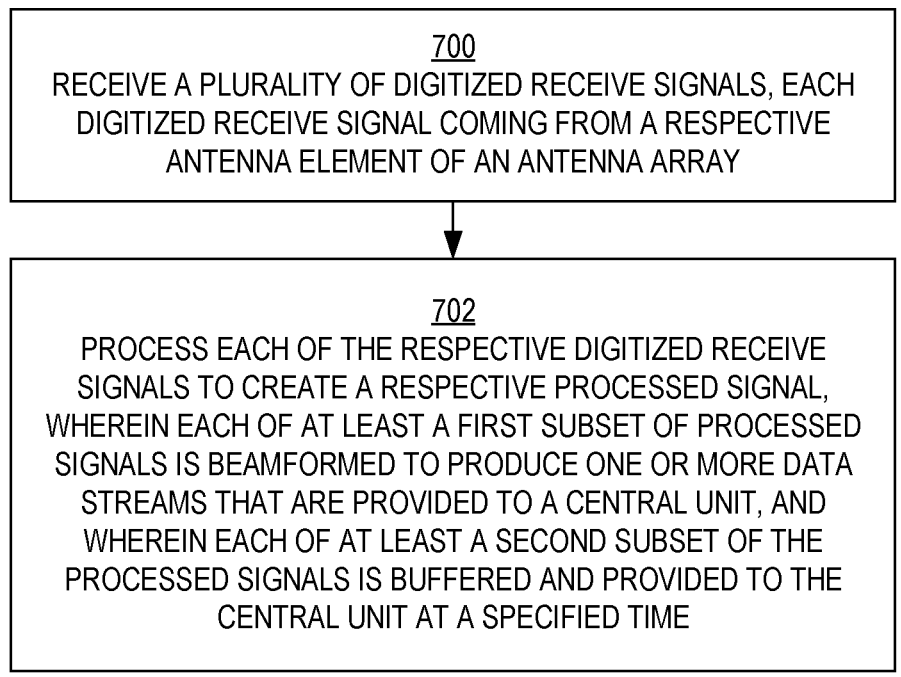
FIG. 7 is a flow chart illustrating another method of a base station according to some embodiments of the present disclosure.

FIG. 7 is a flow chart illustrating another method of a base station according to some embodiments of the present disclosure. In the embodiment illustrated in FIG. 7, the method includes the following steps, which may be performed, for example, at a digital processing block 400 of an RFIC 104.

Step 700. Receive a plurality of digitized receive signals, each digitized received signal coming from a respective antenna element of an antenna array.

Step 702. Process each of the respective digitized receive signals to create a respective processed signal, wherein each of at least a first subset of the processed signals is beamformed to produce one or more data streams that are provided to a CU, and wherein each of at least a second subset of the processed signals is buffered and provided to the CU at a specified time.

The method described in FIG. 7 provides a new interface bandwidth reduction technique, utilizing the fact that mmW systems typically operate in a time division manner, were different time slots are allocated for the Uplink (UL) and for the Downlink (DL) communication over the air-interface. There are many transmission modes standardized by 3GPP; a very typical case uses 20-25% of the time for uplink reception and 75-80% of the time for downlink. The present disclosure takes advantage of the fact that these constraints are present only on the air interface, and therefore discloses a new interfacing method between RFICs and a CU, characterized by one or more of the following:

Within the RFIC:
receiving samples of a receiver data stream in the RFIC, e.g., from a narrowband receiver, said stream being received in the UL communication time intervals (and optionally downsampling the data to a lower data rate, e.g., to select a portion of the NBR frequency range);
storing the samples for transfer over RFIC-to-CU interfaces; and
transferring the data from RFICs to CUs during at least a subset of both UL and DL communication time intervals, e.g., using the interface capability normally used for transferring the signal from carrier paths 404.

Within the CU:
processing the transferred data;
(optional) the CU may upsample the downsampled data stream.

The advantages of the present invention include, but are not limited to, a reduced RFIC to CU data rate, thereby reducing the number of interface connections needed or increasing the number of RFICs that may be used together with the CU, thereby potentially increasing base station EIRP and coverage, and enabling a better use of the resources of the central unit.

To overcome the problem of not being able to transfer wideband data from all antennas to the central unit, the signals that are buffered and sent to the CU may be produced by a narrowband receiver possibly operating with full digital beamforming capability, completely in the digital domain, such as the narrowband receiver 408 in FIG. 4. In some embodiments, the narrowband receiver 408 performs full digital beamforming. In alternative embodiments, the CU, rather than the narrowband receiver 408, performs the digital beamforming. This arrangement provides digital down-conversion and decimation of the signals from each antenna, but no spatial combining of the resulting data streams. This results in narrowband access to each antenna, with full digital beamforming capability. To prevent the interfacing with the CU from being a bottleneck, in one embodiment, the buffer block 410 may comprise the following components, as shown in FIG. 8.

Figure 8:
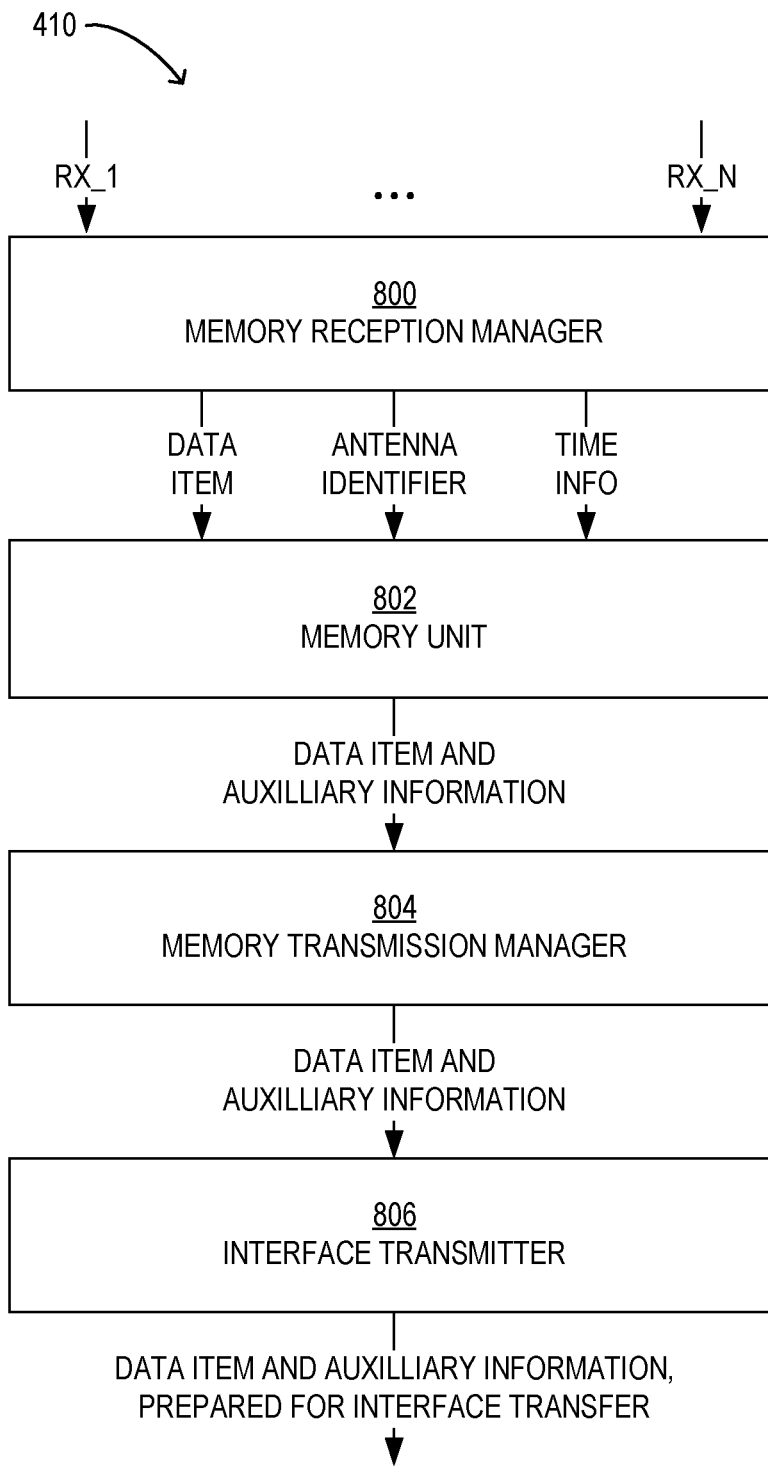
FIG. 8 is a block diagram illustrating at least a portion of buffer 410 according to some embodiments of the present disclosure.

FIG. 8 is a block diagram illustrating at least a portion of buffer 410 according to some embodiments of the present disclosure. In the embodiment illustrated in FIG. 8, buffer 410 comprises the following components.

A memory reception manager 800 that, for each data item: stores the data item; stores the identity/identifier of the originating antenna element associated with the data item; and stores the data item receive time, arrival time, and/or sequence number, associated with the data item.

A digital memory unit 802 for storage of uplink data for a subset of at least one transmission time interval, such as data from the NBR 408, for example. In the embodiment illustrated in FIG. 4, for example, block 410 stores and buffers data from the NBR 408, but in alternative embodiments, the data from WBRs 404 may also or alternatively be buffered. In some embodiments, the full carrier may be buffered and sent to the CU during DL slots (using a DL:UL ratio of 4:1 would give good interface capacity) and could be useful for communicating non-time-critical information to the CU. Likewise, the data from WBRs 404 may be down-sampled prior to buffering, e.g., to select a portion of the full carrier and/or to rate match the available RFIC-to-CU bandwidth.

A memory transmission manager 804 that schedules data items for transmission over the interface between the RFIC and the CU, where the scheduling and transmission of data items is active also during at least a subset of the time where the air interface is allocated for DL transmission, and the scheduling is dependent on at least one of the originating antenna element and the data item receive time, arrival time or sequence number. In some embodiments, the memory transmission manager 804 selects which interface resource to use.

An interface transmitter 806 that sends data items to the CU possibly augmented with at least one identifier of the originating antenna element and the data item receive time, arrival time, or sequence number. The interface transmitter 806 may have dedicated interface capacity for sending the data from the NBR 408, it may reuse existing interface capacity for sending the data from a WBR 404, or it may use some combination of the two.

In some embodiments, the memory reception managers may be responsible for storage of data items in the digital memory unit and for adding auxiliary information, such as the identifier of the originating antenna element and the data item receive time, arrival time, or sequence number, to the memory unit. The memory transmission manager may be responsible for performing the scheduling so that the latency of the data items is kept as low as possible, and for preventing any overflow of the memory unit. The memory reception manager, the memory transmission manager or the interface transmitter may both perform any down-sampling that may be needed.

In some embodiments, the memory managers 800/804 and the interface transmitter 806 operate depending on the configured TDD patterns so that the above latency and overflow objectives are met. A typical TDD pattern may allocate 25% of the time to the UL and 75% of the time to the DL. In this case the interface data rate requirements may be eased a factor of 4, however also other fractions can be configured and the disclosed invention handles any such combination.

Where FIG. 4 shows the buffers 410 as separate blocks, one per antenna input RX_1 through RX_N, in the embodiment illustrated in FIG. 8, the functions of the buffers 410 are shown collectively, i.e., as a single memory reception manager 800, but in alternative embodiments each antenna input may have its own memory reception manager. The same is true for the other blocks in FIG. 8, which are shown collectively as a single memory unit 802, memory transmission manager 804, and interface transmitter 806.

Figure 9:
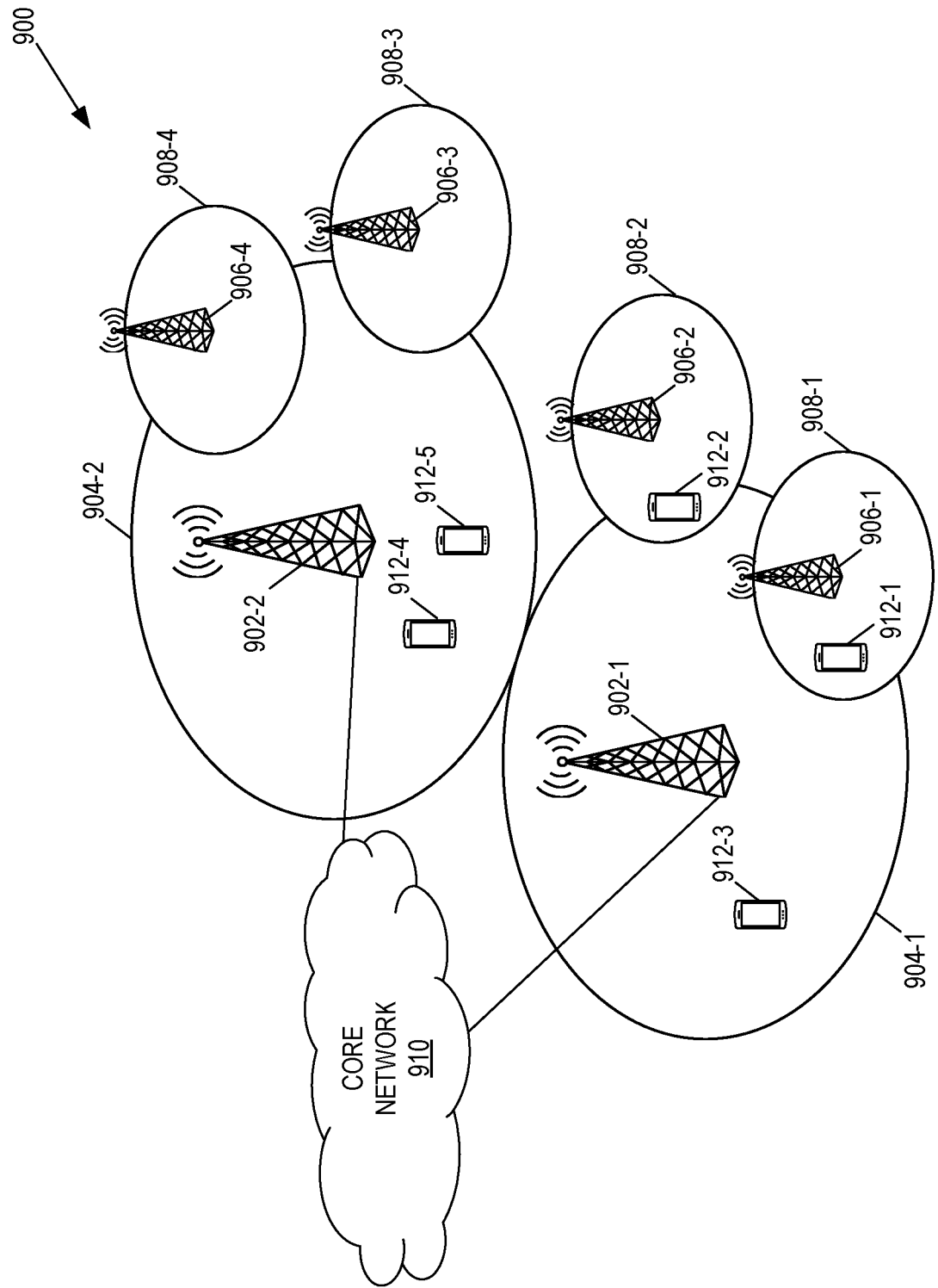
FIG. 9 illustrates one example of a cellular communications network according to some embodiments of the present disclosure.

FIG. 9 illustrates one example of a cellular communications system 900 in which embodiments of the present disclosure may be implemented. In the embodiments described herein, the cellular communications system 900 is a 5G system (5GS) including a NR RAN or LTE RAN (i.e., Evolved Universal Terrestrial Radio Access (E-UTRA) RAN). In this example, the RAN includes base stations 902-1 and 902-2, which in 5G NR are referred to as gNBs (e.g., LTE RAN nodes connected to a 5G Core (5GC), which are referred to as gn-eNBs), controlling corresponding (macro) cells 904-1 and 904-2. The base stations 902-1 and 902-2 are generally referred to herein collectively as base stations 902 and individually as base station 902. Likewise, the (macro) cells 904-1 and 904-2 are generally referred to herein collectively as (macro) cells 904 and individually as (macro) cell 904. The RAN may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The cellular communications system 900 also includes a core network 910, which in the 5G System (5GS) is referred to as the 5GC. The base stations 902 (and optionally the low power nodes 906) are connected to the core network 910.

The base stations 902 and the low power nodes 906 provide service to wireless communication devices 912-1 through 912-5 in the corresponding cells 904 and 908. The wireless communication devices 912-1 through 912-5 are generally referred to herein collectively as wireless communication devices 912 and individually as wireless communication device 912. In the following description, the wireless communication devices 912 are oftentimes UEs, but the present disclosure is not limited thereto.

Figure 10:
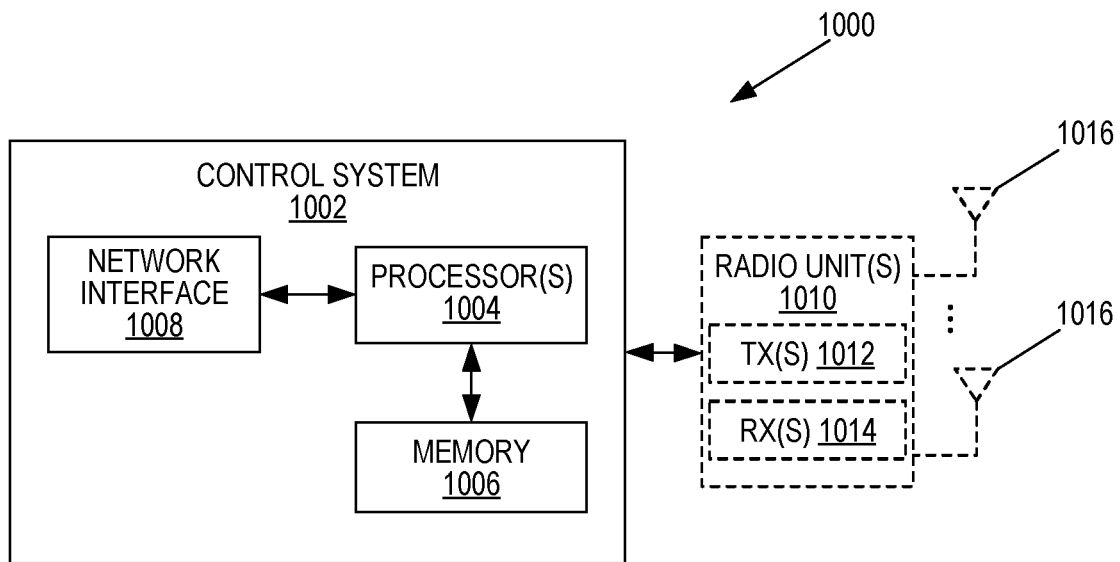
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 902 or 906 or a network node that implements all or part of the functionality of the base station 902 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
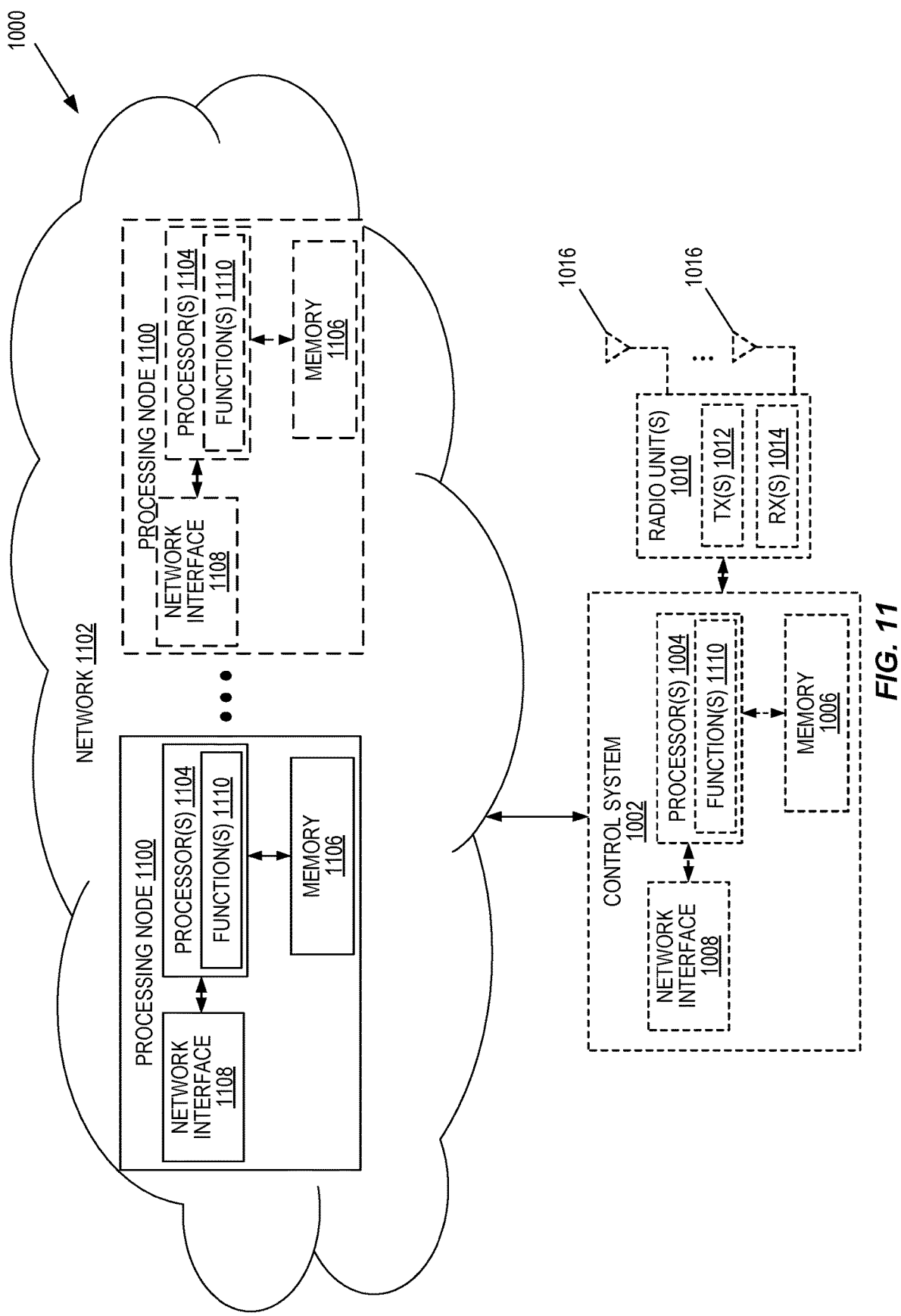
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
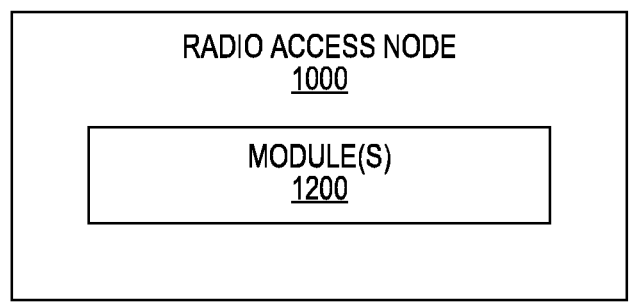
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
MS Advanced Antenna System
ADC Analog to Digital Converter
AF Application Function
AMF Access and Mobility Function
AN Access Network
AP Access Point
ASIC Application Specific Integrated Circuit
AUSF Authentication Server Function
BF Beamform/Beamforming
BP Band Pass
BPF Band Pass Filter
BS Base Station
CH Channel/Channelization
CPU Central Processing Unit
DAC Digital to Analog Converter
DFT Discrete Fourier Transform
DN Data Network DSA Digital Step Attenuator
DSP Digital Signal Processor
DU Digital Unit
EIRP Equivalent Isotropic Radiated Power
eNB Enhanced or Evolved Node B
EPS Evolved Packet System
E-UTRA Evolved Universal Terrestrial Radio Access
FDM Frequency Division Multiplex[ing]
FPGA Field Programmable Gate Array
FR Frequency Range
FT Frequency Tune
GA Gain Adjust
gNB New Radio Base Station
gNB-DU New Radio Base Station Distributed Unit
HB Half Band
HSS Home Subscriber Server
IF Intermediate Frequency
IFFT Inverse Fast Fourier Transform
IoT Internet of Things
IP Internet Protocol
LNA Low Noise Amplifier
LPF Low Pass Filter
LTE Long Term Evolution
MCPS Megachips Per Second
MCSPS Megachips/megasamples Per Second
MIMO Multiple Input Multiple Output
MME Mobility Management Entity
M-MIMO Massive Multiple Input Multiple Output
mmW millimeter Wave
MTC Machine Type Communication
MU-MIMO Multi-User Multiple Input Multiple Output
NBR Narrow-Band Receiver
NCO Numerically Controlled Oscillator
NEF Network Exposure Function
NF Network Function
NR New Radio
NRF Network Function Repository Function
NSSF Network Slice Selection Function
OFDM Orthogonal Frequency Division Multiplexing
OFDMA Orthogonal Frequency Division/Multiple Access
OTT Over-the-Top
PA Power Amplifier
PBCH Physical Broadcast Channel
PC Personal Computer
PCF Policy Control Function
P-GW Packet Data Network Gateway
PLL Phase-Locked Loop
PRACH Physical Random Access Channel
PSS Primary Synchronization Signal
QoS Quality of Service
RACH Random Access Channel
RAM Random Access Memory
RAN Radio Access Network
RF Radio Frequency
RO Random Access Channel Occasion
ROM Read Only Memory
RRH Remote Radio Head
RTT Round Trip Time
SCEF Service Capability Exposure Function
SDM Spatial Domain Multiplexing
SMF Session Management Function
SNR Signal to Noise Ratio
SS Synchronization Signal
SSB Synchronization Signal Block
SSS Secondary Synchronization Signal
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

The invention claimed is:

1. An Advanced Antenna System, AAS, receiver, comprising:
   a digital processing block of a Radio Frequency Integrated Circuit, RFIC, the digital processing block comprising:
   an interface for communicating with a central unit; and
   a plurality of antenna signal processing blocks, each receiving a digitized receive signal from a respective antenna element of an antenna array and each comprising:
   one or more receivers, each receiver comprising circuitry to receive the signal from the respective antenna element and process the received signal to create a processed signal,
   wherein each of at least a first subset of the one or more receivers provides its processed signal to a beamforming block comprising circuitry to beamform the processed signal to produce one or more data streams and provide the one or more data streams to the interface for communication to the central unit, and
   wherein each of at least a second subset of the one or more receivers provides its processed signal to a processing block that buffers the processed signal and that controls when the buffered processed signal is sent to the interface for communication to the central unit.

2. The AAS receiver of claim 1 wherein controlling when the buffered processed signal is sent to the interface for communication to the central unit comprises sending the buffered signal to the central unit during an Uplink, UL, portion of a Time Domain Duplexing, TDD, frame, during a Downlink, DL, portion of a TDD frame, or during both an UL portion and a DL portion of a TDD frame.

3. The AAS receiver of claim 1 wherein the processing block accumulates a first defined portion of the processed signal and provides a result of the accumulation to the central unit.

4. The AAS receiver of claim 3 wherein the first defined portion of the processed signal comprises a subset of a plurality of received symbols for the Physical Random Access Channel, PRACH.

5. A method in an Advanced Antenna System, AAS, receiver, the method comprising:
   at a digital processing block of a Radio Frequency Integrated Circuit, RFIC:
   receiving a plurality of digitized receive signals, each digitized received signal coming from a respective antenna element of an antenna array; and
   processing each of the respective digitized receive signals to create a respective processed signal, wherein each of at least a first subset of the processed signals is beamformed to produce one or more data streams that are provided to a central unit, and wherein each of at least a second subset of the processed signals is buffered and provided to the central unit at a specified time.

6. The method of claim 5 wherein providing each of the at least a second subset of the processed signals to the central unit at a specified time comprises sending the buffered signal to the central unit during an Uplink, UL, portion of a Time Domain Duplexing, TDD, frame, during a Downlink, DL, portion of a TDD frame, or during both an UL portion and a DL portion of a TDD frame.

7. The method of claim 5, further comprising:
accumulating a first defined portion of each of the at least a second subset of the processed signals; and
providing a result of the accumulation to the central unit.

8. The method of claim 7 wherein the first defined portion comprises a subset of a plurality of received symbols for the Physical Random Access Channel, PRACH.

9. An Advanced Antenna System, AAS, receiver, comprising a digital processing block of a Radio Frequency Integrated Circuit, RFIC, the digital processing block comprising circuitry configured to:
receive a plurality of digitized receive signals, each digitized received signal coming from a respective antenna element of an antenna array; and
process each of the respective digitized receive signals to create a respective processed signal, wherein each of at least a first subset of the processed signals is beamformed to produce one or more data streams that are provided to a central unit, and wherein each of at least a second subset of the processed signals is buffered and provided to the central unit at a specified time.

10. The AAS receiver of claim 9, wherein providing each of the at least a second subset of the processed signals to the central unit at a specified time comprises sending the buffered signal to the central unit during an Uplink, UL, portion of a Time Domain Duplexing, TDD, frame, during a Downlink, DL, portion of a TDD frame, or during both an UL portion and a DL portion of a TDD frame.

11. The AAS receiver of claim 9, wherein the digital processing block further comprises circuitry configured to:
accumulate a first defined portion of each of the at least a second subset of the processed signals; and
provide a result of the accumulation to the central unit.

12. The AAS receiver of claim 11, wherein the first defined portion comprises a subset of a plurality of received symbols for the Physical Random Access Channel, PRACH.

13. A base station configured to communicate with a User Equipment, UE, the base station comprising a radio interface comprising an Advanced Antenna System, AAS, receiver that comprises a digital processing block of a Radio Frequency Integrated Circuit, RFIC, configured to:
receive a plurality of digitized receive signals, each digitized received signal coming from a respective antenna element of an antenna array; and
process each of the respective digitized receive signals to create a respective processed signal, wherein each of at least a first subset of the processed signals is beamformed to produce one or more data streams that are provided to a central unit, and wherein each of at least a second subset of the processed signals is buffered and provided to the central unit at a specified time.

14. The base station of claim 13, wherein providing each of the at least a second subset of the processed signals to the central unit at a specified time comprises sending the buffered signal to the central unit during an Uplink, UL, portion of a Time Domain Duplexing, TDD, frame, during a Downlink, DL, portion of a TDD frame, or during both an UL portion and a DL portion of a TDD frame.

15. The base station of claim 13, wherein the digital processing block further comprises circuitry configured to:
accumulate a first defined portion of each of the at least a second subset of the processed signals; and
provide a result of the accumulation to the central unit.

16. The base station of claim 15, wherein the first defined portion comprises a subset of a plurality of received symbols for the Physical Random Access Channel, PRACH.

* * * * *

UNITED STATES PATENT AND TRADEMARK OFFICE
CERTIFICATE OF CORRECTION

| | |
|---|---|
| PATENT NO. | : 12,028,138 B2 |
| APPLICATION NO. | : 17/923743 |
| DATED | : July 2, 2024 |
| INVENTOR(S) | : Nilsson et al. |

It is certified that error appears in the above-identified patent and that said Letters Patent is hereby corrected as shown below:

In the Specification

In Column 3, Line 13, delete "MS" and insert -- AAS --, therefor.

In Column 3, Line 64, delete "MS" and insert -- AAS --, therefor.

In Column 3, Line 67, delete "MS" and insert -- AAS --, therefor.

In Column 4, Line 8, delete "(MS)" and insert -- (AAS) --, therefor.

In Column 4, Line 44, delete "MS" and insert -- AAS --, therefor.

In Column 5, Line 2, delete "MS" and insert -- AAS --, therefor.

In Column 5, Line 18, delete "MS" and insert -- AAS --, therefor.

In Column 14, Line 51, delete "MS" and insert -- AAS --, therefor.

Signed and Sealed this
Twenty-ninth Day of October, 2024

Katherine Kelly Vidal
*Director of the United States Patent and Trademark Office*